US007176895B2

United States Patent
Harif

(10) Patent No.: US 7,176,895 B2
(45) Date of Patent: Feb. 13, 2007

(54) WEARABLE KEYBOARD APPARATUS

(75) Inventor: Shlomi Harif, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1158 days.

(21) Appl. No.: 09/751,076

(22) Filed: Dec. 29, 2000

(65) Prior Publication Data

US 2002/0084989 A1    Jul. 4, 2002

(51) Int. Cl.
G09G 5/00        (2006.01)
G09B 21/00       (2006.01)

(52) U.S. Cl. .................................. 345/169; 434/112

(58) Field of Classification Search ........ 345/156–158, 345/161–163, 167–169, 172, 173, 184; 434/112–115; 235/462.44; 2/48
See application file for complete search history.

(56) References Cited

U.S. PATENT DOCUMENTS 5,222,895 A    6/1993    Fricke ...................... 434/113
5,416,310 A    5/1995    Little ......................... 235/462
5,496,174 A    3/1996    Garner ....................... 434/114
5,721,566 A *  2/1998    Rosenberg et al. ......... 200/6 A
6,195,085 B1 * 2/2001    Becker et al. .............. 248/918
6,271,828 B1 * 8/2001    Rosenberg et al. ......... 200/6 A
6,310,604 B1 * 10/2001   Furusho et al. ............. 345/156

* cited by examiner

Primary Examiner—Bipin Shalwala
Assistant Examiner—Jeff Piziali
(74) Attorney, Agent, or Firm—Duke W. Yee; Jeffrey S. LaBaw; Francis Lammes

(57) ABSTRACT

A keyboard apparatus includes a fabric and switch units coupled to the fabric. Each switch unit includes a capsule containing an electrically responsive liquid, wherein the electrically responsive liquid causes the capsule to increase in rigidity in response to application of an electric field to the electrically responsive liquid. Each switch unit also includes one or more switches coupled to the capsule, wherein a selected pressure applied to the capsule activates or more of the switches underneath the capsule. The keyboard apparatus also contains electrical conducting lines connected to the switch units.

20 Claims, 2 Drawing Sheets

WEARABLE KEYBOARD APPARATUS

BACKGROUND OF THE INVENTION

1. Technical Field

The present invention relates generally to an improved data processing system, and in particular to an apparatus for facilitating user input. Still more particularly, the present invention provides an apparatus for receiving user inputs using a wearable keyboard.

2. Description of Related Art

Wearable computers are becoming tools in a user's environment much like a pencil or a reference book. A wearable computer is a computer that is subsumed or integrated into the personal space of a user and controlled by the user. The wearable computer provides automatic, portable access to information. Furthermore, the information can be automatically accumulated by the system as the user interacts with or modifies the environment thereby eliminating the costly and error-prone process of information acquisition.

Advances in semiconductor technology have made possible high performance microprocessors requiring less power and less space. Further, miniature heads up displays have recently been introduced in which these displays weigh less than a few ounces. These advances along with those in wireless communications technology make possible the shift from computers at a desk to wearable computers.

Challenges still exist in designing wearable computers. Optimally, wearable computers should offer seamless integration of information processing tools with the user. It is desirable to offer functionality in a natural and unintrusive manner. Conventional methods of interaction, such as the use of a conventional keyboard or mouse reduce the functionality of wearable computer system. One solution is to integrate the keyboard within the clothing of a user. Keyboard switches have been imbedded within fabric to create a wearable keyboard. One problem with this type of keyboard is that a user is unable to determine where a particular key or switch is located by feel alone. The user is required to look at the fabric to see the symbols identifying the keys. As a result, the user is unable to focus on other items.

Therefore, it would be advantageous to have an improved apparatus for facilitating user input.

SUMMARY OF THE INVENTION

The present invention provides a keyboard apparatus, which includes a fabric and switch units coupled to the fabric. Each switch unit includes a capsule containing an electrically responsive liquid, wherein the electrically responsive liquid causes the capsule to increase in rigidity in response to application of an electric field to the electrically responsive liquid. Each switch unit also includes a switch coupled to the capsule; wherein a selected pressure applied to the capsule activates the switch. The keyboard apparatus also contains electrical conducting lines connected to the switch units.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
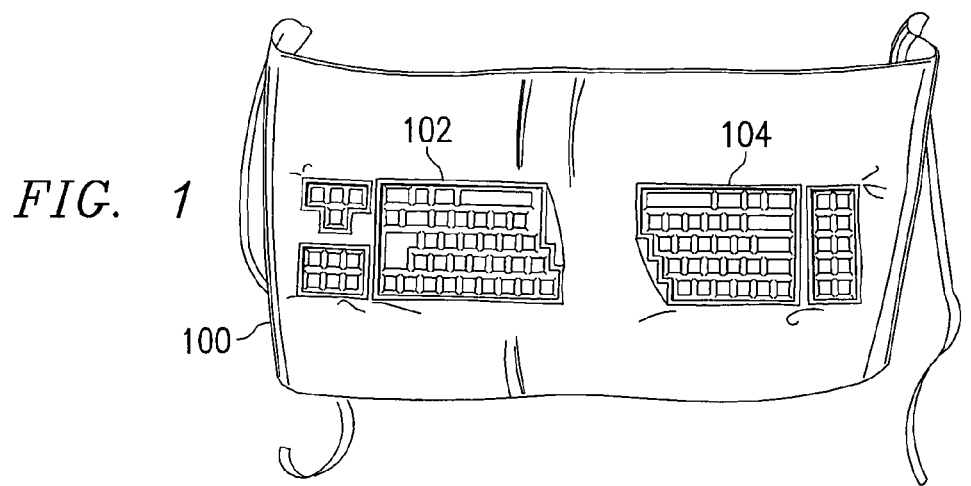
FIG. 1 is a diagram of a wearable keyboard in accordance with a preferred embodiment of the present invention.

With reference now to the figures, and in particular with reference to FIG. 1, a diagram of a wearable keyboard is depicted in accordance with a preferred embodiment of the present invention. Wearable keyboard 100 takes the form of an apron in this example. The keyboard switches, also referred to as "keys", are located in sections 102 and 104 of apron 100. In this example, the keys are split in to two sides to allow for easier reach by a user depending on the implementation all of the keys, and may be located in a single region or in multiple regions. These keys may be designed to provide input similar to a traditional key in which individual keys represent a single character or symbol.

Alternatively, the keys may be set up in a chording keyboard arrangement in which a chord combination may represent letters, numbers, words, commands, or other strings. Chording keyboard systems are smaller and have fewer keys than a traditional keyboard. Instead of the typical sequential, one-at-a-time key presses, chording requires simultaneous key presses for each character typed, similar to playing a musical chord on a piano. The mechanism of the present invention may be implemented using any type of keyboard system.

The present invention provides a keyboard with metallic fibers or conductors connected to sealed keyboard switches coupled to a fabric. These switches may be coupled to the fabric by being embedded within the fabric, glued to the fabric, or sewn to the fabric. The metallic fibers terminate at an output configured for connection to an output. This output is configured to communication with a data processing system. The output may take the form of a physical connector, such as, for example, a universal serial bus (USB), or a wireless communications unit. Further, section 102 may be a single unit with multiple switches that are selectively activated by a user applying pressure to the section. the pressure may be applied using a finger or a stylus. The selective activation of switches generates signals that may control a pointer on a display.

Figure 2:
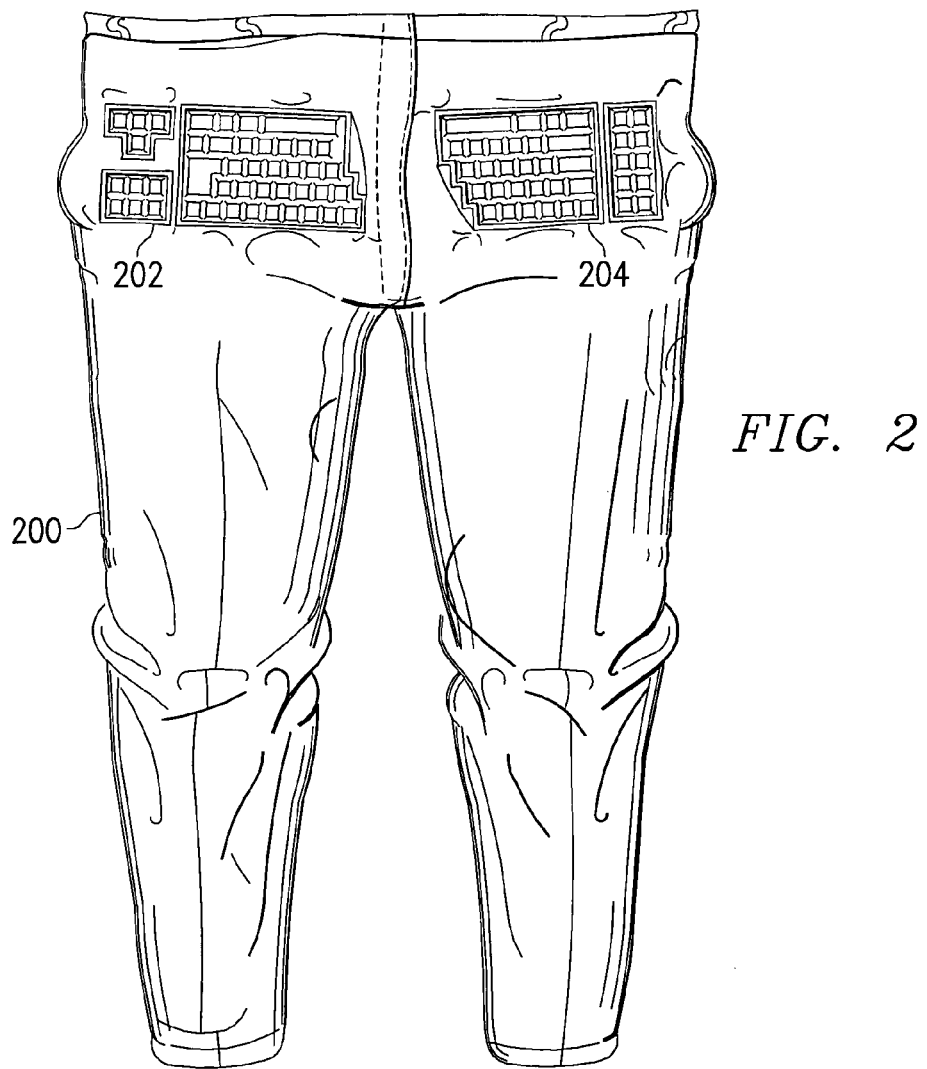
FIG. 2 is a diagram of a wearable keyboard in accordance with a preferred embodiment of the present invention.

With reference now to FIG. 2, a diagram of a wearable keyboard is depicted in accordance with a preferred embodiment of the present invention. Wearable keyboard 200 in this example takes the form of a pair of pants with keys being located in regions 202 and 204. A further feature of the present invention is found in the keys themselves. Each key or switch unit contains an electrically responsive liquid, which increases the rigidity of the key or switch unit when an electrical field, such as through an electric current, is applied to this liquid.

Figure 3:
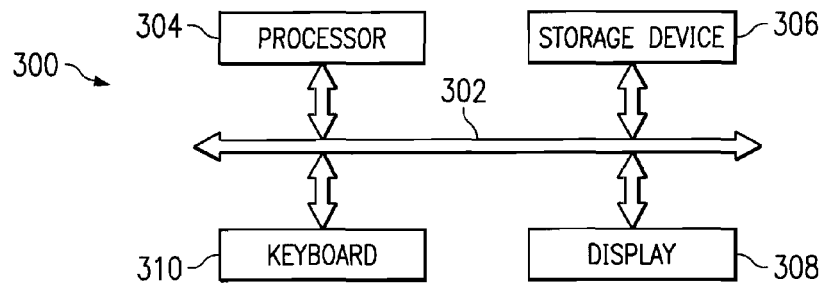
FIG. 3 is a block diagram of a data processing system in accordance with a preferred embodiment of the present invention.

Turning now to FIG. 3, a block diagram of a data processing system is depicted in accordance with a preferred embodiment of the present invention. In this example, data processing system 300 includes a bus 302, interconnecting processor 304, storage device 306, display 308, and keyboard 310. Processor 304 executes instructions located in storage device 306, which may take the form of memory, a hard disc drive, or some other storage system. Display 308 functions to present information to a user and may take the form of a heads up display unit in these examples. Keyboard 310 is a wearable keyboard system.

Figure 4:
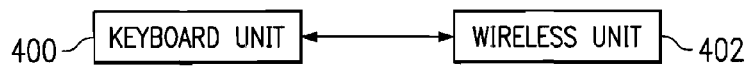
FIG. 4 is a block diagram of a wearable keyboard in accordance with a preferred embodiment of the present invention.

Turning next to FIG. 4, a block diagram of a wearable keyboard is depicted in accordance with a preferred embodiment of the present invention. In this example, keyboard unit 400 contains keys or switches, which become rigid such that they can be sensed or detected by the fingers of a user. Keyboard unit 400 is connected to wireless unit 402, which provides communication to a computer.

Figure 5A:
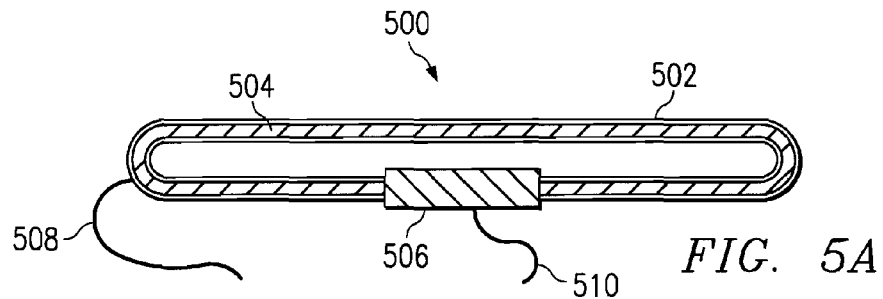
FIGS. 5A–5C are diagrams illustrating a switch unit in a wearable keyboard in accordance with a preferred embodiment of the present invention.
Figure 5B:
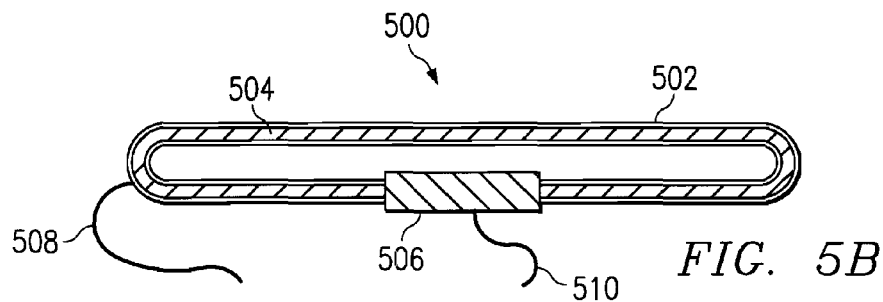
Figure 5C:
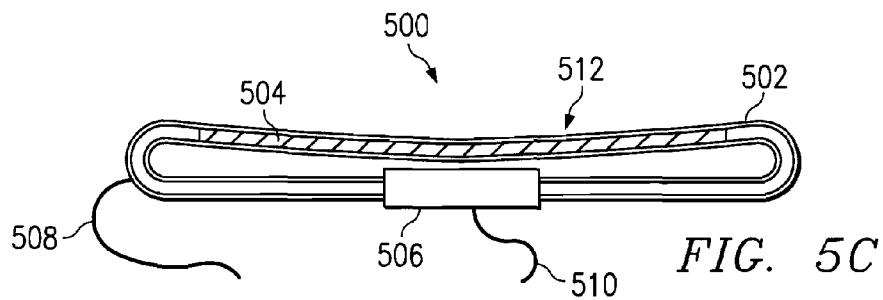

Turning next to FIGS. 5A–5C, diagrams illustrating a switch unit in a wearable keyboard is depicted in accordance with a preferred embodiment of the present invention. In FIG. 5A, switch unit 500 is in an unpowered mode. Switch unit 500 includes a capsule 502, which contains electrically responsive liquid 504. Electrorheological fluids are an example of an electrically responsive liquid, which may be used with switch unit 500. Theses types of fluids adhere to electrodes and the volume of these fluids increase when an electrical field is applied. Further, the viscosity of the fluid increases in response to application of an electrical field.

The top portion of capsule 502 is covered or embedded within a fabric. Switch unit 500 also includes a switch 506, which takes the form of a piezoelectric-sensitive component. When switch unit 500 is in the unpowered mode, this component generates no current preventing a spurious keystroke input. In this example, wire 508 connects switch unit 500 to a power source, while wire 510 leads to a keyboard sensing unit. These wires are embedded within the fabric.

In FIG. 5B, switch unit 500 is now in a powered, but unpressed mode. In this example, capsule 502 is stretched by internal pressure caused by the application of an electrical field to electrically responsive liquid 504. Switch unit 502 is now more rigid and easier to sense or detect by the fingers of a user. Power is supplied to switch unit 500 through wire 508. The pressure within capsule 502 is sufficient to provide a feedback current indicating that the key can be activated.

In FIG. 5C, switch unit 500 is now in a pressed mode. Pressure through a key press is illustrated in section 512. This key press increases the pressure within capsule 502, causing switch 506 to generate a current that is detectable as a keystroke input. An alternate method in which these switches may be used might be as a drawing tablet or mouse cursor movement panel; a large, square button with multiple sensors embedded in it would provide analogous pointing capability to those found on laptops for moving, pointing, and selecting an item on a computer display.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A keyboard apparatus comprising:
   a fabric;
   a plurality of switch units coupled to the fabric, wherein each switch unit within the plurality of switch units includes:
   a capsule containing an electrically responsive liquid, wherein the electrically responsive liquid causes the capsule to increase in rigidity in response to application of an electric field to the electrically responsive liquid;
   a switch coupled to the capsule, wherein a selected pressure applied to the capsule activates the switch; and
   a plurality of electrical conducting lines connected to the plurality of switch units.

2. The keyboard apparatus of claim 1, wherein the switch is a piezoelectric-sensitive component.

3. The keyboard apparatus of claim 1, wherein the electrically responsive liquid causes the capsule to expand when an electrical field is applied to the electrically responsive liquid.

4. The keyboard apparatus of claim 1, wherein the fabric is integrated within an article of wearing apparel.

5. The keyboard apparatus of claim 1, wherein the plurality of switches is coupled to the fabric by being embedded within the fabric.

6. The keyboard of claim 5, wherein the fabric includes a plurality of symbols in locations on the fabric identifying the plurality of switches.

7. The keyboard apparatus of claim 1, wherein a number of the plurality of switch units have a different rigidity from others in the plurality of switch units when an electric field is applied to the electrically responsive liquid.

8. The keyboard apparatus of claim 1, wherein the electrically responsive liquid is an electrorheological fluid.

9. A keyboard comprising:
   a fabric;
   a plurality of switch units couple to the fabric, wherein each switch unit includes:
   a sealed unit containing an electrically responsive liquid;
   a switch, wherein the electrically responsive liquid in each switch unit increases in viscosity in response application of an electric field to the electrically responsive liquid; and
   a plurality of electrical conducting lines connected to the plurality of switch units and an output configured for connection to a data processing system.

10. The keyboard of claim 9, wherein the output is a wireless transmitter.

11. The keyboard of claim 9, wherein the output is a universal serial bus connector.

12. A data processing system comprising:
   a bus system;
   a memory connected to the bus system, wherein a set of instructions are located in the memory;
   a processor unit connected to the bus system, wherein the processor unit executes instructions; and
   a keyboard connected to the bus system, wherein the keyboard is embedded in a fabric and includes:
   a plurality of switch units attached to the fabric, wherein each switch unit within the plurality of switch units includes:

a capsule containing an electrically responsive liquid, wherein the electrically responsive liquid causes the capsule to increase in rigidity in response to application of an electric field to the electrically responsive liquid;

a switch coupled to the capsule, wherein a selected pressure applied to the capsule activates the switch; and a plurality of electrical conducting lines connected to the plurality of switch units.

13. A pointing apparatus comprising:

a fabric; and a switch unit coupled to the fabric, wherein the switch unit includes:

a capsule containing an electrically responsive liquid, wherein the electrically responsive liquid causes the capsule to increase in rigidity in response to application of an electric field to the electrically responsive liquid; and a plurality of switches coupled to the capsule, wherein a selected pressure applied to a portion of the capsule activates one or more of the plurality of switches.

14. The pointing apparatus of claim 13, wherein activation of one or more of the plurality of switches generates signals to control a pointer on a display of a data processing system.

15. The pointing apparatus of claim 13, wherein the capsule is in shape of a rectangle.

16. The keyboard apparatus of claim 4, wherein the article of wearing apparel is one of an apron and a pair of pants.

17. The keyboard of claim 9, wherein the fabric is integrated within an article of wearing apparel.

18. The keyboard of claim 17, wherein the article of wearing apparel is one of an apron and a pair of pants.

19. The pointing apparatus of claim 13, wherein the fabric is integrated within an article of wearing apparel.

20. The pointing apparatus of claim 19, wherein the article of wearing apparel is one of an apron and a pair of pants.

* * * * *